United States Patent
Hartrampf et al.

(10) Patent No.: US 9,261,346 B2
(45) Date of Patent: Feb. 16, 2016

(54) POSITION DETECTION DEVICE

(75) Inventors: Ralf Hartrampf, Wagenfeld (DE);
Andreas Giefer, Lemfoerde (DE);
Ludger Rake, Steinfeld (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 129 days.

(21) Appl. No.: 14/117,865

(22) PCT Filed: Jul. 9, 2012

(86) PCT No.: PCT/EP2012/063354
§ 371 (c)(1),
(2), (4) Date: Nov. 21, 2013

(87) PCT Pub. No.: WO2013/007670
PCT Pub. Date: Jan. 17, 2013

(65) Prior Publication Data
US 2014/0111228 A1    Apr. 24, 2014

(30) Foreign Application Priority Data

Jul. 14, 2011 (DE) .......................... 10 2011 079 174

(51) Int. Cl.
| | |
|---|---|
| *G01B 7/14* | (2006.01) |
| *G01B 7/00* | (2006.01) |
| *G01D 5/24* | (2006.01) |

(52) U.S. Cl.
CPC . *G01B 7/003* (2013.01); *G01D 5/24* (2013.01)

(58) Field of Classification Search
CPC .............................. G06F 3/033–3/0354; G06F 3/03545–3/03548; G01B 7/003
USPC ......................................................... 345/161
See application file for complete search history.

(56) References Cited

U.S. PATENT DOCUMENTS

| 5,708,369 A | 1/1998 | Horn |
| 5,790,107 A * | 8/1998 | Kasser et al. ................. 345/174 |

(Continued)

FOREIGN PATENT DOCUMENTS

| DE | 1 952 293 | 12/1966 |
| DE | 40 39 842 C1 | 1/1992 |

(Continued)

OTHER PUBLICATIONS

German Search Report Corresponding to 10 2011 079 174.4 mailed Jul. 18, 2013.

(Continued)

*Primary Examiner* — Patrick Assouad
*Assistant Examiner* — Demetrius Pretlow
(74) *Attorney, Agent, or Firm* — Michael J. Bujold; Davis & Bujold, P.L.L.C.

(57) ABSTRACT

A position detection device having a first electrode pair, an electrically conductive body that forms an electrical resistor which is electrically connected to the electrodes of the first electrode pair and extends in a first direction (y), between them, and with a measurement electrode which is in electrically conductive contact with the surface of a measurement area of the body located between the electrodes of the first electrode pair and can move relative thereto. The body is electrically connected to the electrodes of a second electrode pair and extends between them in a second direction (x) such that the measurement area is located between the electrodes of the second electrode pair.

14 Claims, 4 Drawing Sheets

(56) References Cited

U.S. PATENT DOCUMENTS

| | | | |
|---|---|---|---|
| 5,949,354 A * | 9/1999 | Chang | 341/33 |
| 6,115,030 A * | 9/2000 | Berstis et al. | 345/161 |
| 6,184,865 B1 * | 2/2001 | Zimmerman et al. | 345/160 |
| 6,700,565 B2 * | 3/2004 | Niiyama | 345/172 |
| 7,310,084 B2 * | 12/2007 | Shitanaka et al. | 345/156 |
| 8,872,806 B2 * | 10/2014 | Huang et al. | 345/184 |
| 2002/0070918 A1 * | 6/2002 | Grivas et al. | 345/161 |
| 2004/0183553 A1 | 9/2004 | Post et al. | |
| 2007/0138513 A1 * | 6/2007 | Sato et al. | 257/239 |
| 2010/0060577 A1 * | 3/2010 | Wang | 345/161 |
| 2010/0328263 A1 * | 12/2010 | Lin | 345/174 |

FOREIGN PATENT DOCUMENTS

| | | |
|---|---|---|
| DE | 44 42 711 A1 | 6/1996 |
| DE | 10 2007 008 155 A1 | 8/2008 |

OTHER PUBLICATIONS

International Search Report Corresponding to PCT/EP2012/063354 mailed Sep. 27, 2012.
Written Opinion Corresponding to PCT/EP2012/063354 mailed Sep. 27, 2012.
International Preliminary Report on Patentability Corresponding to PCT/EP2012/063354 mailed Sep. 18, 2013.

* cited by examiner

POSITION DETECTION DEVICE

This application is a National Stage completion of PCT/EP2012/063354 filed Jul. 9, 2012, which claims priority from German patent application serial no. 10 2011 079 174.4 filed Jul. 14, 2011.

FIELD OF THE INVENTION

The invention concerns a position detection device, with a first electrode pair, an electrically conductive body that forms an electrical resistor which is electrically connected to the electrodes of the first electrode pair and extends in a first direction between them, and a measurement electrode which is in electrically conductive contact with the surface of a measurement area of the body, which measurement electrode is located between the electrodes of the first electrode pair and can move relative thereto.

BACKGROUND OF THE INVENTION

To determine travel paths, Hall sensors, optical sensors and inductive systems are used. For example, DE 10 2007 008 155 A1 discloses a device for detecting relative movements of chassis components of a chassis, which comprises a signal emitter attached on a first chassis component and a signal receiver attached on a second chassis component that can move relative to the first chassis component, the signal receiver being designed such that the three-dimensional position of the signal emitter relative to the signal receiver can be determined. In this case the signal emitter comprises a magnet and the signal receiver a 3D Hall sensor.

The disadvantage of such a no-contact detection method is that its realization incurs considerable costs.

SUMMARY OF THE INVENTION

Starting from there, the purpose of the present invention is to be able to design a position detection device of the type mentioned at the beginning, which is as inexpensive as possible.

That objective is achieved with a position detection device according to the description that follows.

The position detection device comprises a first electrode pair, an electrically conductive body that forms an electrical resistor which is electrically connected to the electrodes of the first electrode pair and extends in a first direction between them, and a measurement electrode which is in electrically conductive contact with the surface of a measurement area of the body, the measurement electrode being located between the electrodes of the first electrode pair and being able to move relative to them, while in addition the body is connected to the electrodes of a second electrode pair and extends in a second direction between them, such that the measurement area is located between the electrodes of the second electrode pair.

In this position detection device an electric potential that can be measured by the measurement electrode depends on the position of the measurement electrode on the surface of the measurement area when it is exposed to an electric field. Since by applying an electric voltage to the first electrode pair an electric field can be produced in the body in the first direction and by applying an electric voltage to the second electrode pair an electric field can be produced in the second direction, with reference to the electric potential that can be measured by the measurement electrode it is possible to determine the position of the measurement electrode on the surface of the measurement area in two dimensions. Although it is true that the position detection device does not work in a no-contact manner, the friction occurring between the measurement electrode and the surface of the measurement area and the wear resulting therefrom are negligible in many applications. Furthermore an already existing component, which by virtue of its intended function is in contact with a second component, can be used for example as the body or as the measurement electrode. Thus there is often no need for a no-contact sensor system, so the cost incurred for such a system can be saved. The measurement electrode is preferably designed as a sliding electric contact which rests against the surface of the measurement area and can slide along it.

The two directions concerned are in particular spatial directions. Preferably the two directions are different, since this facilitates a clear two-dimensional determination of the position of the measurement electrode. Preferably the two directions are perpendicular to one another, which simplifies the representation of the position of the measurement electrode in an orthogonal co-ordinate system as often used in the prior art as a reference system. Preferably, the surface of the measurement area extends parallel to the two directions so that any influences of a third spatial direction on the measurement can be reduced or even avoided. Alternatively, however, a non-parallel course of the surface of the measurement area relative to the two directions is also possible. For example, the surface of the measurement area can be flat, curved or undulating.

According to one embodiment the body is rectangular. Preferably the body consists of a conductive plastic, preferably a plastic loaded with graphite or carbon. Advantageously the electrodes consist of metal and, for example, they are applied on the body in the form of a metallic surface coating. Preferably the electrodes are formed on sidewalls of the body which, preferably, extend transversely or substantially transversely relative to the surface of the measurement area.

The measurement area can be identical to the body itself. Preferably, however, the measurement area is smaller than the body so that, for example, the distorting effects of corners and/or edges of the body and/or of the electrodes upon the position determination can be reduced. Preferably, the measurement area is a distance away from the corners and/or edges of the body.

Preferably at least one operating voltage source is provided, by means of which an electric operating voltage can be applied to the electrodes of the first and/or the second electrode pair. In particular, the operating voltage source is a source of direct-current voltage.

In a possible embodiment one of the electrodes of the first electrode pair and one of the electrodes of the second electrode pair form a first logic electrode pair while the other of the electrodes of the first electrode pair and the other of the electrodes of the second electrode pair form a second logic electrode pair. In this case, by means of the operating voltage source an operating voltage can preferably be applied to the electrodes of the first and/or the second logic electrode pair. As regards the electrical switching, the electrode pairs can then be replaced by the logic electrode pairs.

In a further development a control unit is provided, by means of which the electrode pairs can be or are connected to the operating voltage source successively in time one after the other, preferably in alternation. Preferably, at least one voltmeter electrically connected to the measurement electrode is provided, which voltmeter is or can also be connected to a first electrode of the first electrode pair and/or to a first electrode of the second electrode pair in order to be able to measure the electric voltage between the first electrode concerned and the measurement electrode. Such a voltage measurement gives information about the electric potential at the point of contact between the measurement electrode and the surface of the measurement area. Preferably an evaluation unit that comprises the voltmeter or is coupled thereto is provided, by means of which the position of the measurement electrode on the surface of the measurement area can be determined on the basis of the voltage measured. The position of the measurement electrode is preferably determined in two dimensions, i.e. in relation to the two directions. The control unit and the evaluation unit can be devices separate from one another. Alternatively, the control unit can incorporate the evaluation unit or be combined therewith in a conjoint device. The control unit can also incorporate the voltmeter. For a fuller diagnosis by the position detection device it is also possible to measure the voltage between the measurement electrode and both electrodes of one of the electrode pairs.

According to a further development a first component connected to the body and/or forming it and/or incorporating it, and a second component connected to the measurement electrode and/or forming it and/or incorporating it are provided, which second component can move relative to the first component, in particular being fitted so as to move on it. By means of the evaluation unit the position of the two components in relation to one another can preferably be determined. The components are in particular components of a vehicle. The body is preferably connected firmly and/or solidly to the first component and/or mounted on the first component. The body can also be fitted on the first component in a movable manner. The measurement electrode is preferably connected firmly and/or solidly to the second component and/or mounted on the second component. The measurement electrode can also be fitted on the second component in a movable manner.

In a further development a shift lever device for a vehicle is provided, which comprises the two components. In particular the shift lever device comprises a shift lever support that forms or incorporates one of the components, and a shift lever that forms or incorporates the other of the components. Relative to its support the shift lever can be moved to various shift lever positions and the shift lever position currently engaged can be determined by the evaluation unit. In particular, the shift lever is mounted on the support so that it can swivel about a pivot axis in such manner that relative to the support the shift lever can be swiveled about the pivot axis into its various shift lever positions. The support is fixed or, for example, mounted on the body structure of the vehicle. Preferably a vehicle transmission coupled to the evaluation unit is provided, which can be actuated as a function of the shift lever position engaged at the time. In particular, the support forms or incorporates the first component and the shift lever the second component. Alternatively, the support can form or incorporate the second component and the shift lever the first component.

In an embodiment the shift lever device comprises a ratchet that co-operates with a detent element, by means of which the shift lever can be locked in various shift lever positions. Preferably the support forms or comprises the ratchet in which the detent element provided on the shift lever can engage in the various shift lever positions. Moreover, the body can be formed by the support or the ratchet or by part of the support or the ratchet.

The invention also concerns the use of the, or of a position detection device for determining the position of the measurement electrode on the surface of the measurement area, whereby:

in a first step an electric operating voltage is applied to the electrodes of the first electrode pair and a first electric voltage between the measurement electrode and a first one of the electrodes of the first electrode pair is measured, in a second step an electric operating voltage is applied to the electrodes of the second electrode pair and a second electric voltage is measured between the measurement electrode and a first one of the electrodes of the second electrode pair, and in a third step, from the measured voltages the position of the measurement electrode on the surface of the measurement area is determined, in particular calculated. The procedure can be developed further in all the embodiments explained in connection with the position detection device.

The first and second steps are preferably carried out successively in time. In particular, the second step is carried out later than the first step. The position of the measurement electrode is calculated in particular by the evaluation unit. Preferably, the evaluation unit determines the currently engaged shift lever position of the shift lever.

In an embodiment, the mechanical position of the measurement electrode is determined with reference to its position in an electric field. In this case the material of which the body is made should preferably be electrically conductive in order to facilitate or enable sensing. On the component, which consists for example of an electrically conductive plastic, in particular two electrode pairs are attached. To determine the position of the measurement electrode an electric voltage is applied to the electrodes, which produces an electric field in the body. By way of the measurement electrode a voltage is now measured in the electric field, which voltage is functionally dependent on the location of the measurement electrode within the field. To carry out a two-dimensional position determination the electric field is applied, in particular alternating in time, in two different directions which are for example perpendicular to one another. Since no additional sensor components are necessarily needed, the invention provides an inexpensive possibility for position detection.

BRIEF DESCRIPTION OF THE DRAWINGS

Below, the invention is described with reference to a preferred embodiment illustrated in the drawings, which show.

DETAILED DESCRIPTION OF THE PREFERRED EMBODIMENTS

Figure 1:
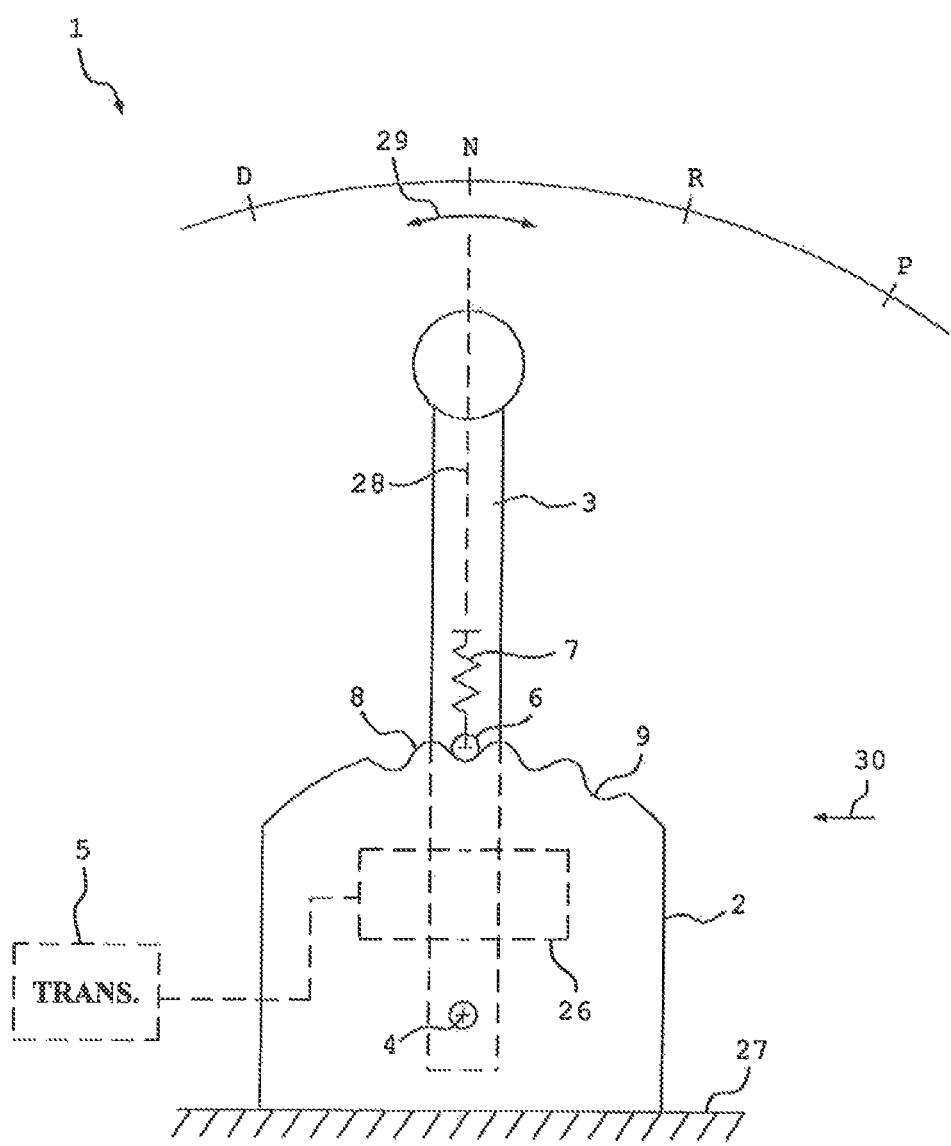
FIG. 1: A side view of a shift lever device for a motor vehicle, which comprises an embodiment of a position detection device.

FIG. 1 shows a schematic representation of a shift lever device 1, which comprises a support 2 fixed on a vehicle body of a vehicle, and a shift lever 3 which is mounted on the support 2 in such manner that it can swivel about a pivot axis 4. The shift lever 3 can be swiveled about the pivot axis 4 relative to the support 2 to various shift positions P, R, N and D, which are associated with different operating conditions of a motor vehicle transmission 5 indicated in FIG. 1 using broken lines. The longitudinal axis of the shift lever 3 is indexed 28. Furthermore, the swiveling direction of the shift lever 3 is indicated by the index 29.

On the shift lever 3 is fitted a movable detent element 6 which is pressed by a spring 7 against a ratchet 8 formed on the support 2. The ratchet has surmountable retaining recesses 9 in which the detent element 6 can engage. Each of the shift lever positions P, R, N and D is specifically associated with one of the ratchet's retaining recesses 9. To detect the currently engaged shift lever position, a position detection device 26 is provided, which is connected to the transmission 5 and is indicated in FIG. 1 with broken lines. As shown in FIG. 1, the currently engaged shift lever position is N.

Figure 2:
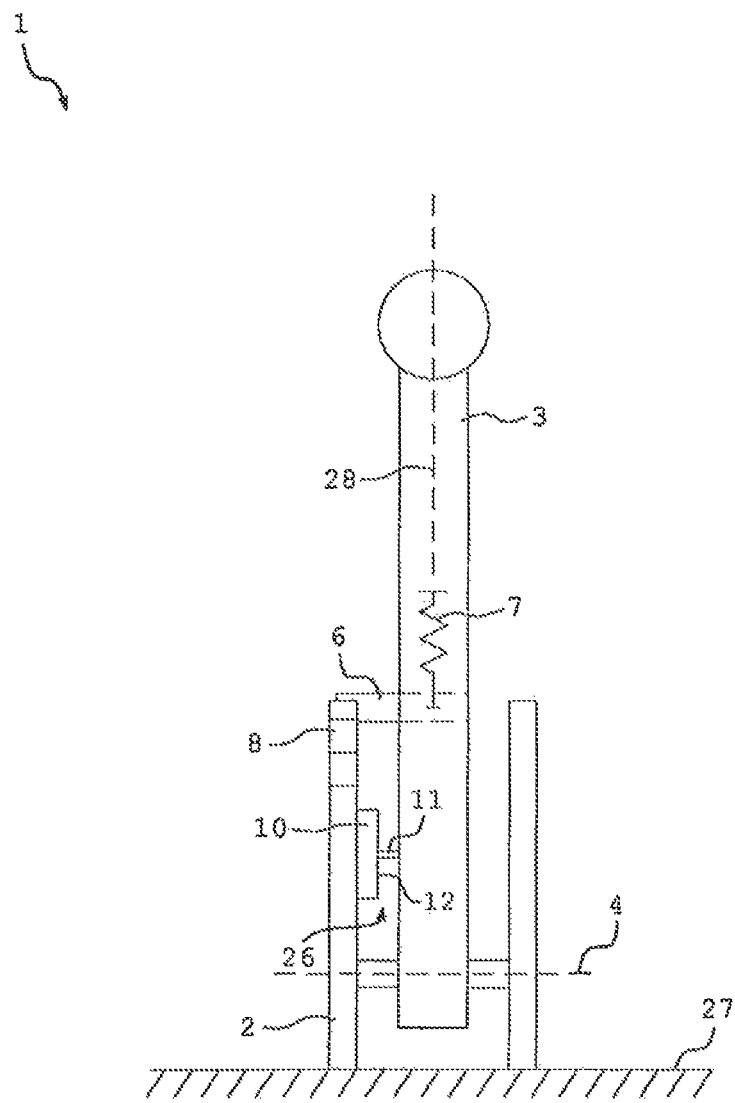
FIG. 2: A front view of the shift lever device.

FIG. 2 shows a view of the shift lever device 1 seen in the direction of the arrow indexed 30 in FIG. 1 which is directed along the longitudinal direction of the vehicle, wherein an electrically conductive body 10 that forms an electrical resistor is fixed onto the support 2. To the shift lever 3 is attached a measurement electrode 11 in the form of a sliding electrical contact, which is in electrically conductive contact with a surface 12 of the body 10 that faces toward the shift lever 3. When the shift lever 3 is swiveled about its pivot axis 4 relative to the support 2, the measurement electrode 11 is carried with the shift lever 3 and slides along the surface 12.

Figure 3:
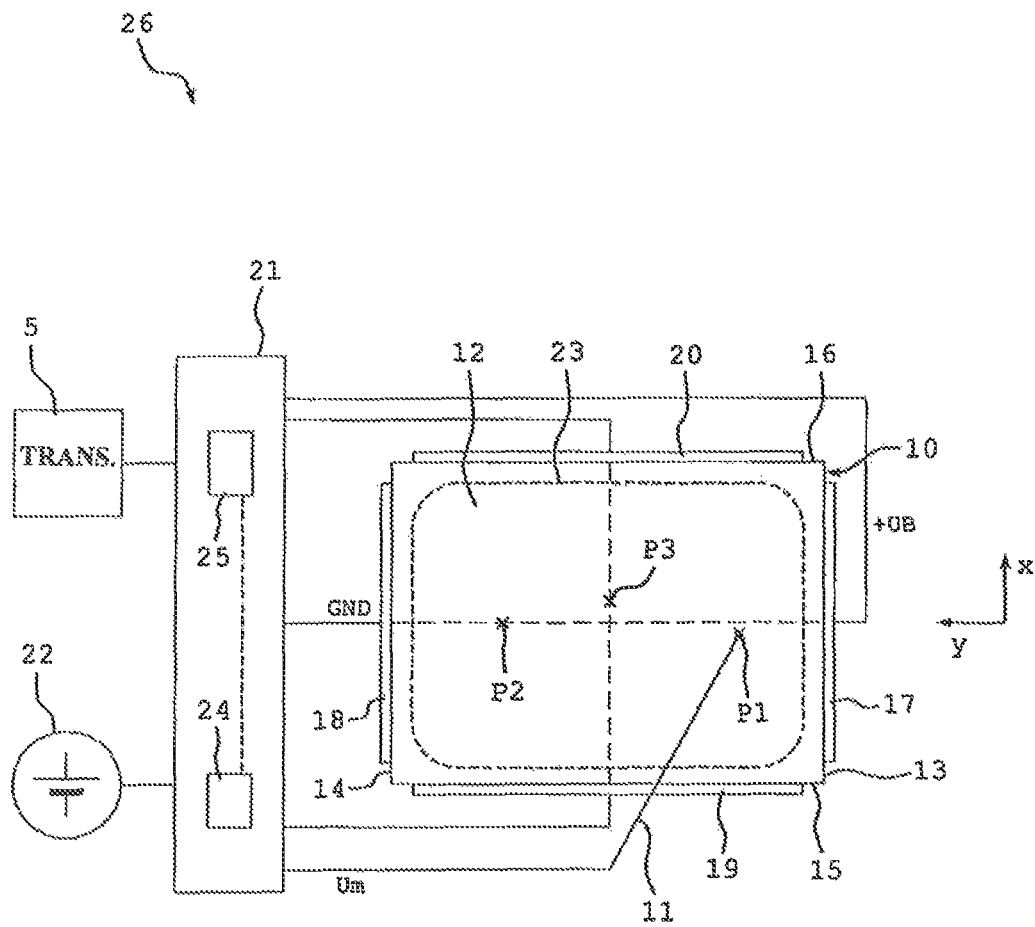
FIG. 3: A representation of the position detection device in a first measurement condition.

FIG. 3 shows a schematic representation of a top view of the position detection device 26, in which positions P1, P2 and P3 that the measurement electrode can be in are shown on the surface 12. The selection of these positions shown is understood to be indicated only as an example, without restrictive intention, and the measurement electrode 11 could therefore also adopt other positions. In FIG. 3 the measurement electrode 11 is currently shown in Position P1, meaning that the measurement electrode 11 is in electrically conductive contact with the surface 12 at the location of the point P1.

The body 10 is of rectangular form and is electrically connected on its side faces 13, 14, 15 and 16 to electrodes 17, 18, 19 and 20 respectively, such that the electrodes 17 and 18 opposite one another in the y-direction form a first electrode pair and the electrodes 19 and 20 opposite one another in the x-direction form a second electrode pair. The electrodes 17 to 20 and the measurement electrode 11 are electrically connected to a control unit 21 which is electrically coupled to an operating voltage source.

Figure 4:
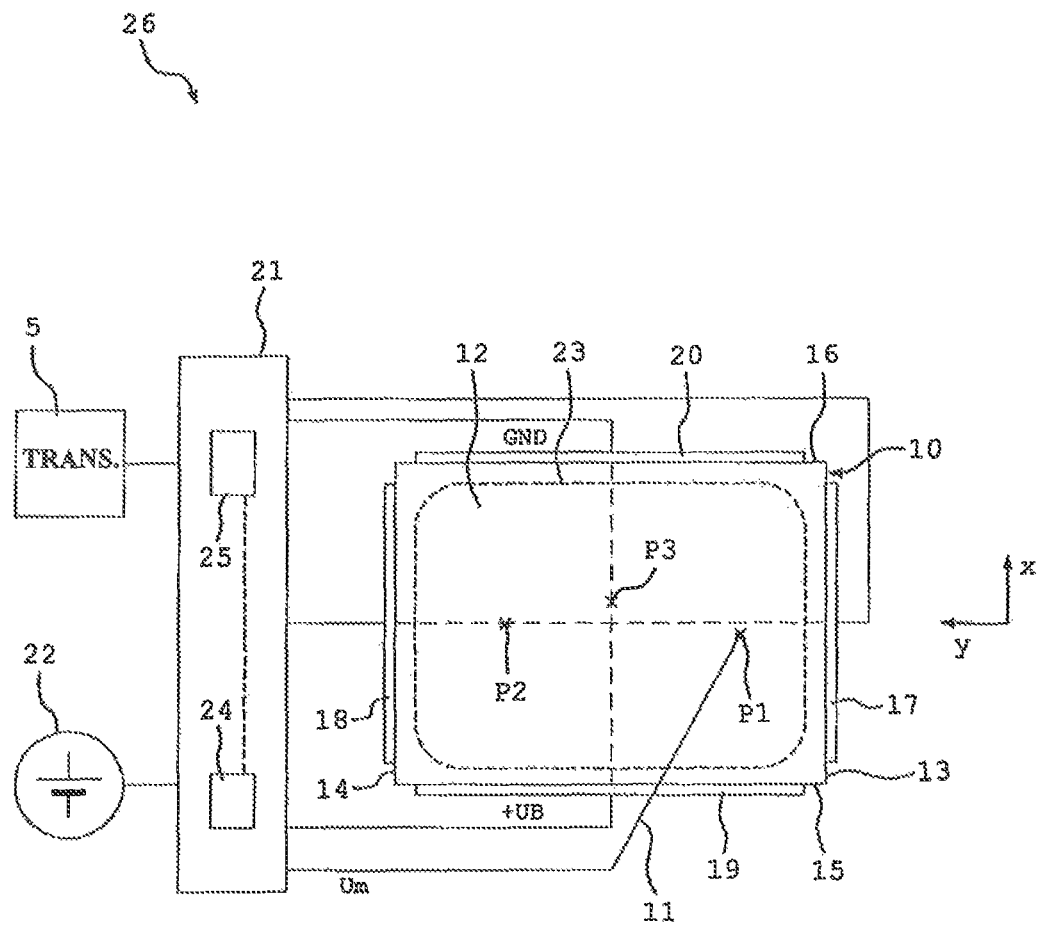
FIG. 4: A representation of the position detection device in a second measurement condition.

By means of the control unit 21, in a first measurement condition shown in FIG. 3 an operating voltage UB is applied to the electrodes 17 and 18 of the first electrode pair and the electric voltage Um between the measurement electrode 11 and the electrode 18 is measured. Then, by means of the control unit 21, in a second measurement condition shown in FIG. 4 the operating voltage UB is applied to the electrodes 19 and 20 of the second electrode pair and the electric voltage Um between the measurement electrode 11 and the electrode 20 is measured. The operating voltage UB is delivered by the voltage source 22 and is in this case a direct-current voltage, the poles of the voltage UB being indicated by the signs "+" and "GND". The voltages Um are measured by a voltmeter 24 incorporated in the control unit 21.

Since the voltages measured in the first measurement condition are related to the y-direction and those measured in the second measurement condition are related to the x-direction, by virtue of the two measurements the location P1 and thus the position of the measurement electrode 11 relative to the surface 12 can be determined in two dimensions. For this purpose the control unit 21 also comprises an evaluation unit 25 coupled to the voltmeter 24, by means of which the point P1 can be determined from the measured voltages Um. Moreover, the evaluation unit 25 checks whether the point P1 is associated with one of the shift lever positions. If so, the associated shift lever position is determined by the evaluation unit 25 and if necessary the transmission 5 coupled to the control unit 21 is actuated appropriately.

When the measurement electrode 11 is in contact with the surface 12 at the locations of the points P2 or P3, the procedure is analogous to that described for the point P1.

In a test, with an operating voltage of 5V for example the following voltages Um were measured at the measurement electrode 11:

| Point | Potential in the y-direction | Potential in the x-direction |
|-------|------------------------------|------------------------------|
| P1    | 2.53 V                       | 2.53 V                       |
| P2    | 2.08 V                       | 2.52 V                       |
| P3    | 2.39 V                       | 1.89 V                       |

Here, the potential in the y-direction corresponds to the voltage Um in the first measurement condition and the potential in the x-direction corresponds to the voltage Um in the second measurement condition.

Accordingly, with two consecutive voltage measurements the position of the measurement electrode 11 on the surface 12 can be determined unambiguously. Since this position depends on the currently engaged shift lever position of the shift lever 3, the current shift lever position of the shift lever 3 can also be determined from the voltage measurements.

Ideally, the entire surface of the body 10 facing toward the shift lever 3 could be used for detecting the position of the measurement electrode 11. In practice, however, distortions of the electric field can occur at the corners and edges of the body 10, so that it is preferable only to take measurements within a measurement area 23 which is smaller that the body 10. Thus, the surface 12 is preferably restricted to the measurement area 23. Yet, it should not be excluded that the measurement area 23 can extend over the whole of the body 10, such that the surface 12 corresponds to the whole of the surface of the body 10 facing toward the shift lever 3. In the embodiment illustrated, the surface 12 is rectangular or substantially so.

LIST OF INDEXES

1 Shift lever device
2 Support
3 Shift lever
4 Pivot axis
5 Transmission
6 Detent element
7 Spring
8 Ratchet
9 Retaining recesses
10 Body
11 Measurement electrode
12 Surface of the body
13 Side face of the body
14 Side face of the body
15 Side face of the body
16 Side face of the body
17 Electrode
18 Electrode
19 Electrode
20 Electrode
21 Control unit
22 Operating voltage source
23 Measurement area
24 Voltmeter
25 Evaluation unit
26 Position detection device
27 Vehicle body structure 28 Longitudinal axis of the shift lever
29 Swiveling direction of the shift lever
30 Longitudinal direction of the vehicle
x Direction
y Direction
UB Operating voltage
Um Measured voltage
P1 Position of the measurement electrode
P2 Position of the measurement electrode
P3 Position of the measurement electrode
P Shift lever position
R Shift lever position
N Shift lever position
D Shift lever position

The invention claimed is:

1. A position detection device comprising:
first and second electrode pairs,
an electrically conductive body (10) that forms an electrical resistor which is electrically connected to electrodes (17, 18, 19, 20) of the first and the second electrode pairs and which extends in a first direction (y), between the electrodes (17, 18) of the first electrode pair, and in a second direction (x), between the electrodes (19, 20) of the second electrode pair, and
a measurement electrode (11) being in electrically conductive contact with a surface (12) of a measurement area (23) of the body (10) located between the electrodes (17, 18, 19, 20) of the first and the second electrode pairs and being movable in relation to the first and the second electrode pairs,
at least one voltmeter (24) being electrically connected to the measurement electrode (11), which voltmeter also being electrically connectable to at least one of a first electrode (18) of the first electrode pair and a first electrode (20) of the second electrode pair, for measuring an electric voltage between the first electrode (18; 20) concerned and the measurement electrode (11).

2. The position detection device according to claim 1, wherein the first and the second directions (x, y) are perpendicular to one another.

3. The position detection device according to claim 1, wherein the surface (12) of the measurement area (23) extends parallel to the first and the second directions (x, y).

4. The position detection device according to claim 1, wherein an operating voltage (UB) is applied by at least one operating voltage source (22) to the electrodes of at least one of the first electrode pair and the second electrode pair.

5. The position detection device according to claim 4, wherein a control unit (21) electrically connects, sequentially in time, the first and the second electrode pairs to the operating voltage source (22).

6. The position detection device according to claim 1, wherein an evaluation unit (25) either incorporates the voltmeter (24) or is coupled thereto, and a position of the measurement electrode (11), on the surface (12) of the measurement area (23), is determined by the evaluation unit on a basis of the measured voltages.

7. The position detection device according to claim 6, wherein positions of the first and the second components, in relation to one another, can be determined by the evaluation unit (25).

8. The position detection device according to claim 7, wherein a shift lever device (1) for a vehicle, which comprises a support (2) forming one of the first and the second components and a shift lever (3) forming another of the first and the second components, which is movable relative to the support (2) to various shift lever positions (P, R, N, D) so that a currently engaged shift lever position is determinable by the evaluation unit (25).

9. The position detection device according to claim 8, wherein a vehicle transmission (5) is coupled to the evaluation unit (25), and the transmission is actuatable as a function of the currently engaged shift lever position.

10. The position detection device according to claim 1, wherein a first component is either connected to or comprises the body, and a second component is either connected to or comprises the measurement electrode which is mounted and movable on the first component.

11. A method of detecting a position with a position detection device having first and second electrode pairs, an electrically conductive body (10) that is electrically connected to electrodes (17, 18, 19, 20) of the first and the second electrode pairs and extends in a first direction (y), between the electrodes (17, 18) of the first electrode pair, and in a second direction (x), between the electrodes (19, 20) of the second electrode pair, a measurement electrode (11) which is in electrically conductive contact with a surface (12) of a measurement area (23) of the body (10) located between the electrodes (17, 18, 19, 20) of the first and the second electrode pairs and is movable in relation to the electrodes (17, 18, 19, 20) of the first and the second electrode pairs, at least one voltmeter (24) is electrically connected to the measurement electrode (11), the at least one voltmeter is electrically connectable to at least one of a first electrode (18) of the first electrode pair and a first electrode (20) of the second electrode pair so as to measure electric voltage between the measurement electrode (11) and the first electrode (18; 20) of either the first or the second electrode pair, the method comprising the steps of:
applying an electric operating voltage (UB) to the electrodes (17, 18) of the first electrode pair;
measuring a first electric voltage between the measurement electrode (11) and the first of the electrodes (18) of the first electrode pair;
applying an electric operating voltage (UB) to the electrodes (19, 20) of the second electrode pair;
measuring a second electric voltage between the measurement electrode (11) and a first of the electrodes (20) of the second electrode pair; and
calculating a position (P1, P2, P3) of the measurement electrode (11) on the surface (12) of the measurement area (23) from the measured first and the second voltages.

12. The method according to claim 11, further comprising steps of applying the electric operating voltage (UB) to the electrodes (17, 18) of the first electrode pair, and measuring the first electric voltage (Um) between the measurement electrode (11) and the first electrode (18) of the first electrode pair before applying the electric operating voltage (UB) to the electrodes (19, 20) of the second electrode pair, and measuring the second electric voltage (Um) between the measurement electrode (11) and the first electrode (20) of the second electrode pair.

13. The method according to claim 11, further comprising calculating, the position of the measurement electrode on the surface of the measurement area from the measured first and second voltages either at a same time as or at a later time than the application of the electric operating voltage to the electrodes of the second electrode pair, and the measuring of the second electric voltage between the measurement electrode and the first of the electrodes of the second electrode pair.

14. The method according to claim 11, further comprising a step of determining a position of a currently engaged shift lever by an evaluation unit (25).

\* \* \* \* \*